INVENTORS
Alden H. Jacobson
Bruno A. Holmstrom
Harry W. Ostlund
ATTORNEY

United States Patent Office 3,401,583
Patented Sept. 17, 1968

3,401,583
MACHINE TOOL WITH TOOL FEED CONTROL
Alden H. Jacobson, Paxton, Bruno A. Holmstrom, West Boylston, and Harry W. Ostlund, Holden, Mass., assignors to The Heald Machine Company, Worcester, Mass., a corporation of Delaware
Filed Sept. 7, 1965, Ser. No. 485,365
9 Claims. (Cl. 77—3)

ABSTRACT OF THE DISCLOSURE

A metal working apparatus having means to advance a tool into a workpiece, which apparatus includes a hydraulic system having a variable-orifice valve and programmable means for selecting various orifice sizes from time to time during a machine cycle.

---

In many machine tools, it is necessary to advance a cutting tool toward a workpiece to permit the removal of stock from the workpiece in accordance with a predetermined pattern. This is true, for instance, in a grinding machine where the abrasive wheel is the tool and is advanced toward the workpiece in various ways to remove stock by the abrasive process. In the case of a boring machine, the boring spindle is rotated, causing a single-point tool to rotate in a circle; the spindle is then advanced longitudinally to generate a cylindrical surface. In most modern machine tools of this type, a hydraulic cylinder is used to bring about the relative motion between the tool and the workpiece. In separate portions of the machining cycle it is necessary to advance the tool or to retract it at different speeds, thus requiring the admission and removal of hydraulic fluid from the cylinder at various rates during the machining cycle. For instance, when the boring spindle carries two tools (one for rough cutting and the other following it some distance behind for finish cutting), it may be necessary to move the spidle toward the workpiece at a rapid rate while the first tool is engaging the surface for a rough cut and to advance it at a slow rate a short time later in order to permit the second tool to produce a finish surface. As the art of finishing workpieces becomes more sophisticated, the machining cycles become more and more complex, so that the manner in which the oil is admitted and removed from the hydraulic cylinder must be adjusted from point to point in the machine cycle according, in some cases, to a very complicated pattern. In the past, this has been accomplished by using a valve having a predetermined orifice size for each of the speeds of motion of the cylinder and by switching the oil from one valve to another by means of additional solenoid-operated valves. This system is not only expensive but also complex, difficult to repair, and takes up a considerable amount of space. These and other difficulties experienced with the prior art devices have been obviated in a novel manner by the present invention.

It is, therefore, an outstanding object of the invention to provide a machine tool in which the feed motion may be adjusted readily from one speed to another by relatively simple means.

Another object of this invention is the provision of a machine tool having a hydraulic feed cylinder the introduction and removal of oil from which is controlled to a large number of predetermined rates by relatviely simple and inexpensive mechanism.

A further object of the present invention is the provision of a machine tool in which oil flow is controlled by a single mechanism to give a large number of predetermined selective flow rates.

It is another object of the instant invention to provide a machine tool in which a desired hydraulic flow rate may be selected from a large number of predetermined flow rates in any order and at any time during a machining cycle.

It is a further object of the invention to provide a machine tool capable of a large number of feed rates which tool is inexpensive to manufacture, easy to maintain, and capable of a long life of useful service.

A still further object of this invention is the provision of a machine tool permitting an extremely flexible selection of feed rates by simple electrical control selection.

It is a still further object of the present invention to provide a machine tool capable of a large number of predetermined flow rates in which the individual flow rates may be adjusted from the exterior of the machine.

It is a still further object of this invention to provide a machine tool capable of a large number of randomly-selected feed rates in which the individual flow rates pass from one to another in a natural sequence.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which.

Figure 1:
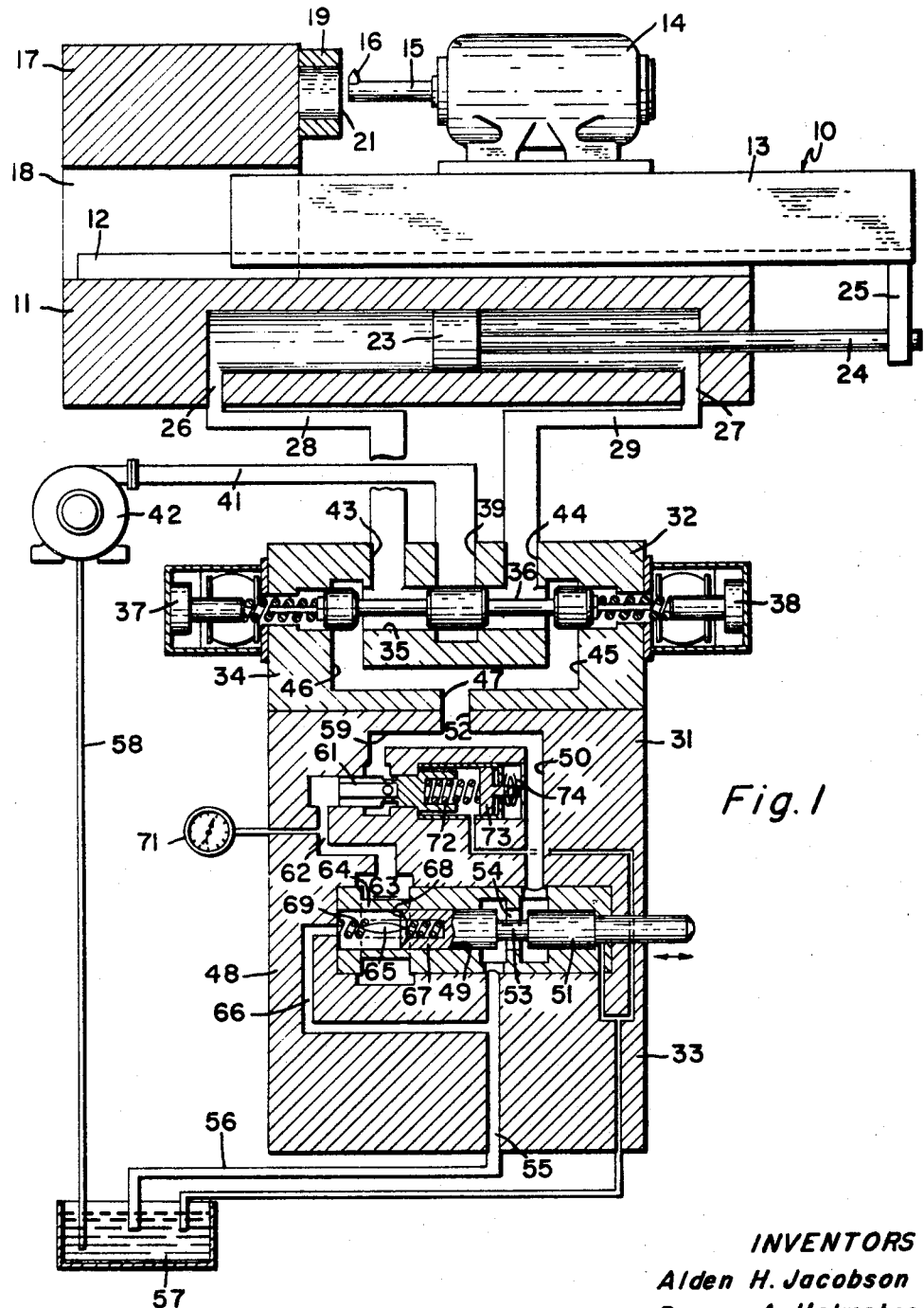
FIG. 1 is a somewhat schematic view of a machine tool embodying the principles of the present invention.

Referring first to FIG. 1, which best shows the general features of the invention, the machine tool, indicated generally by the reference numeral 10, is shown as consisting of a base 11 having on its upper horizontal surface a set of ways 12 on which is slidably mounted a tool support 13. Mounted on the tool support is a motorized head 14 from which extends a horizontal spindle 15 at the outer end of which is carried a single-point cutting tool 16. Extending upwardly from one end of the base 11 is a work support 17 having a passage 18 extending therethrough to permit the movement of the tool support 13. Mounted on the work support facing the spindle 15 is a workpiece 19 which, for the purposes of illustration, is shown as having a bore 21 which is to be finished by means of the cutting tool 16.

Extending through the base 11 in the direction of the ways with its axis parallel to the ways 12 is a bore 22 in which is slidably carried a piston 23 connected to a piston rod 24 which is fastened at its outer end to a flange 25 extending downwardly from the undersurface of the tool support 13. The bore 22 with the piston 23 and the rod 24 form a hydraulic linear actuator or cylinder. A port 26 extends into the base 11 at one end of the bore 22, while a similar port 27 extends into the other end. Connected to the ports 26 and 27 by means of conduits 28 and 29, respectively, is a control apparatus 31. This apparatus consists of a direction-regulating valve 32 and a flow-regulating valve 33. The directional-regulating valve 32 consists of a body 34 through which extends a bore 35 slidably carrying a valve spool 36. One end of the spool is attached to a solenoid 37 and the other end is attached to a solenoid 38. A port 39 enters the body 34 and the bore 35 and is connected by a conduit 41 to a source of high-pressure fluid, such as a pump 42. At one side of the port 39 is a port 43 to which the conduit 28 is connected while, at the other side, is arranged a port 44 to which the conduit 29 is connected. Further along the bore 35 is a passage 45 while, in the opposite direction along the bore 35 (outwardly of the port 43), is a similar passage 46, these passages being joined and opening to the outer portion of the body 34 through a port 47. The configuration of the spool 36 is such that when the solenoid 38 draws the spool to the righthand side the port 44 is connected to the passage 45 and the port 39 is connected to the port 43. On the other hand, when the spool is pulled to the left, the port 43 is connected to the passage 46, while the port 44 is connected to the port 39.

The flow-regulating valve 33 is shown somewhat schematically as having a body 48 having a bore 49 carrying a spindle 51 whose longitudinal position in the bore is adjustable. Entering the body 48 is a port 52 which is connected to the port 49 of the direction-regulating valve 32. The port 52 is connected by a passage 50 to the bore 49 at an area where the spindle 51 is formed with a reduced portion 53. The reduced portion and a short section of the bore define an orifice 54 which is connected by a passage 55 and a conduit 56 to an oil sump 57. The sump, in turn, is connected by a conduit 58 to the input side of the pump 42.

The port 52 is also connected by a passage 59 to one side of a pressure-regulating valve 61, the other side of which is connected by a passage 62 to an annular chamber 63 concentric with the bore 49 but separated from it by a tubular wall 64. Through this wall and coextensive with the chamber 63 extends a lozenge-shaped orifice 65. The extreme end of the bore 49 is connected by a passage 66 to the passage 55 and to the sump 57.

The end of the spindle 51 which lies in the bore 49 adjacent the orifice 65 is provided with a cylindrical portion 67 having a conical recess 68 which provides for a sharp edge at the end of the spindle. A spring 69 extends between the end of the spindle and the end of the bore 49 to bias the spindle to the right in the drawing.

A pressure gage 71 is connected to the passage 62; that is to say, it is located downstream of the pressure-regulating valve 61. The pressure-regulating valve includes a spring 72 whose pressure in the valve determines the downstream pressure which is being regulated. The tension in this spring can be adjusted and controlled by means of a plunger 73 associated with a solenoid coil 74 to one of two positions to produce one of two tensions in the spring 72.

Figure 2:
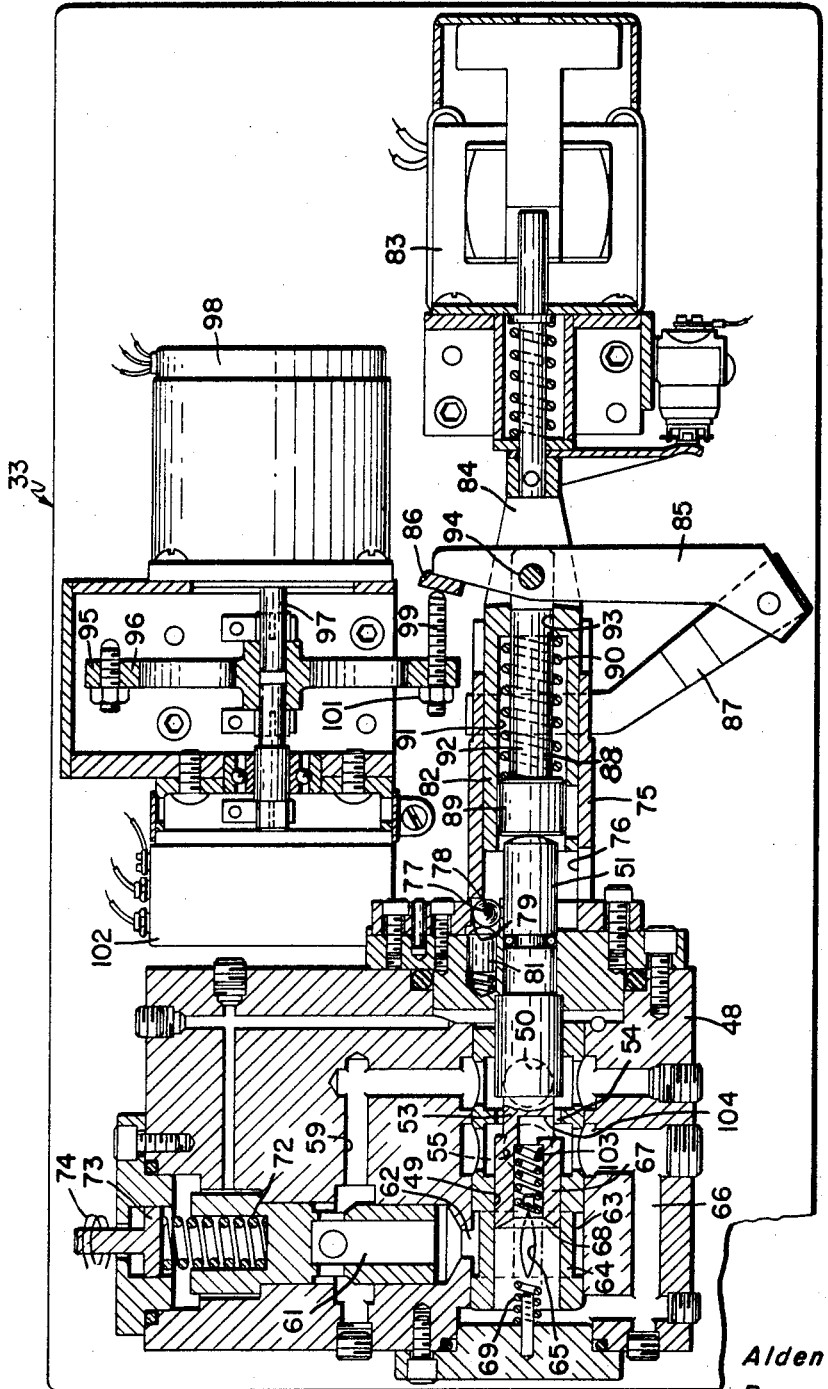
FIG. 2 is a horizontal sectional view of a portion of the apparatus.
Figure 3:
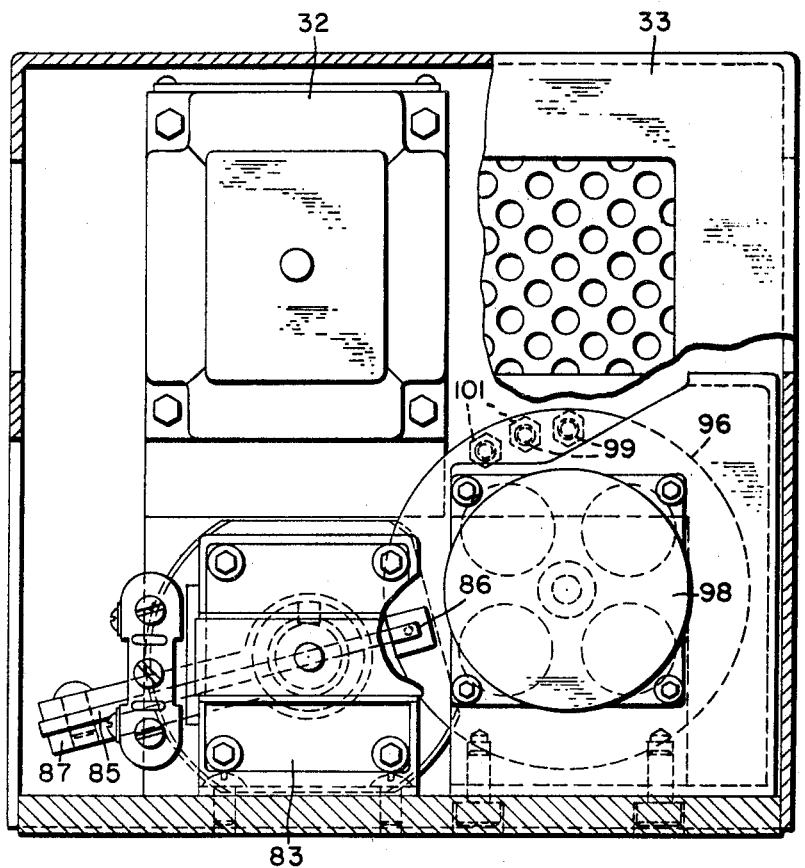
FIG. 3 is a vertical elevational view of the apparatus shown in FIG. 2 as viewed from the right end thereof.

FIGS. 2 and 3 show the details of construction of the flow-regulating valve 33. FIG. 3 shows the manner in which the direction-regulating valve 32 is mounted on the main body 48 of the flow-regulating valve, so that the port 47 communicates with the port 52. Mounted on the outside of the body 48 and extending away from the body coaxially of the bore 49, is an abutment 75 having a bore 76 which is coaxial with the bore 49 and into which the right-hand end of the spindle 51 extends. Associated with the abutment at the point where it is attached to the body 48 of the flow-regulating valve 33 is a clutch 77 consisting of a ball 78, a track between the surface of the spindle 51, and a wall surface 79 which is inclined so that the portion of the surface closest to the bore 49 is spaced further away from the axis than the other end. The ball is jammed into the wedge formed by the surface 79 and the surface of the spindle 51 by a spring-biased plunger 81. Carried in the bore 76 is a sleeve 82 which, at its outer end, is connected to a solenoid 83. This outer end is provided with a vertical slot 84 and, in this slot resides the central portion of a lever 85. The upper end of the lever is provided with a contact pad 86 and the lower end is hingedly attached to a support arm 87 mounted on the outer surface of the abutment 75. Pivotally attached to the intermediate portion of the lever 85 (where it lies within the slot 84) is a plunger 88 having a cylindrical head 89 which slides freely in a bore 91 formed in the sleeve 82 and opening in the direction facing the spindle 51. The plunger 88 is provided with a reduced portion 92 and a coil spring 90 surrounds the reduced portion and presses against the head 89 at one end and against the bottom of the bore 91 at the other end. The reduced portion 92 extends through an aperture 93 at the end of the sleeve 82 for hinged attachment to the lever 85 by means of a hinge pin 94. Mounted laterally of the abutment 75 is a cam 95 consisting of a disc 96 mounted on the shaft 97 of a motor 98. The motor is of the slo-syn type which produces a distinct discreet angular motion in response to each pulse of electricity transmitted to it.

In the preferred embodiment, each pulse produces an angular motion of the shaft with the 250 ounce-inches of torque; the stepping motor will drive at about 200 discreet steps of rotations per revolution, or 360/200 degrees per step. It is possible, therefore, by introducing a suitable number of pulses into the motor 98 to rotate the disc 96 very accurately to a given position. Arranged around the inner circle adjacent the periphery of the disc are adjustable screws 99, each locked in a position of adjustment by a lock nut 101. All screws extend parallel to the axis of the disc 96 and parallel to the axis of the bore 49; furthermore, they extend axially away from the right-hand surface of the disc 96 various predetermined distances. The other end of the shaft 97 (which is not connected to the motor 98) is attached to a potentiometer 102, the reading of which gives at any given time the exact position of rotation of the disc 96. It, therefore, indicates which one of the screws 99 resides adjacent the pad 86 of the lever 85. It will be understood that the controls (which make use of the information produced by the potentiometer 102 and serve to produce pulses carried to the motor 98 to produce rotation of the disc 96 as well as to place various electrical impulses on the solenoids 37, 38, and 83 as well as the coil 74) are well known in this art and need not be described more fully in the present description.

The operation of the apparatus will now be readily understood in view of the above description. With the motor in the head 14 operating, the spindle 15 is rotated to carry the cuting tool 16 in a circular path. In order to advance the spindle 15 into the bore 21 of the workpiece to generate a cylindrical surface with the cutting tool, it is necessary to move the tool support 13 over the ways 12 relative to the base 11 and the work support 17 and the workpiece 19. For this purpose, oil is under pressure and admitted into the port 27 at the right-hand end of the bore 28 to move the piston 23 to the left. In order to do this, the solenoid 37 is energized and the spool 36 occupies a position within the bore 35 such that pressure oil leaving the pump 42 flows through the conduit 41 to the port 39, through the bore 35, out through the port 44 and the conduit 29 to the port 27 at the right-hand end of the cylinder of the bore 22. The piston 23 moves to the left and forces oil out of the left-hand side of the cylinder, through the port 26 and the conduit 28 to the direction-regulating valve 32. This discharge oil flows into the port 43 and flows through the bore 35 and out through the passage 46 and the port 47 to the flow-regulating valve 33. The oil enters the valve 33 through the port 52. A portion of the oil passes through the passage 50, through the orifice 54 (defined by a portion of the bore 49 and the reduced portion 53 of the spindle 51), down through the passage 55 and the conduit 56 to the sump 57. The oil also flows from the port 52 through the passage 59 through the pressure-regulating valve 61 and the passage 62 to the chamber 63. It flows from the chamber 63 through the lonzenge-shaped orifice 65 into the bore 49 from which it flows to the left out through the passage 66, the passage 55 and the conduit 56 to the sump. Because the orifice 54, in the condition of the spindle 51 that is shown in FIG. 1, is in almost its largest condition, and because the orifice 65 is only closed slightly by the end of the cylindrical portion 67 of the spindle, the area of opening available for the oil to flow is quite high and the piston 23 will be permitted to move through the bore 22 at a very rapid rate. This is the speed that would take place, for instance, when the tool support 13 is being advanced toward the workpiece and the spindle 15 and the tool 16 have not as yet reached the workpiece.

Now, referring to FIGS. 2 and 3, it can be seen that the rate of flow of oil from the cylinder is determined by the size of the orifice 54 and the size of the orifice 65. As one moves the spindle 51 from the position shown in FIG. 1 to the left, the orifice 54 is, eventually, closed by the large cylindrical end of the spindle and no flow takes place through that opening. As a matter of fact, before this enlarged portion reaches the portion of the bore, which defines the orifice 54, the flow will gradually be reduced. At the time that the orifice 54 is entirely closed, the orifice 65 is only partly closed and continues to permit oil to flow from the cylinder through its branch. As the spindle motion continues to the left, the orifice 54 remains closed and the orifice 65 is reduced further in area as the spindle reaches its left-hand extreme position. This means that at the slower speeds the only valve which controls the discharge of oil from the cylinder is the valve represented by the orifice 65. At faster speeds, the orifice 54 enters into the picture and permits high rates of fluid flow with a minimum of restriction.

The manner in which this relationship is taken advantage of is clear in FIG. 2. Every time a new setting of the spindle 51 takes place, the solenoid 83 immediately retracts the sleeve 82 to the right carrying the lever 85 and the pad 86 with it. The motor 98 is actuated by the control until a suitable screw 99 is brought into position in alignment with the pad 86. Then, when the solenoid is energized, the sleeve 82 is thrown to the left carrying the lever 85 with it until the pad 86 strikes the end of the screw. Movement of the lever 85 causes the head 89 of the plunger 88 to strike the end of the spindle 51 and move it to the left to a position determined by the adjustment of the particular screw 99 involved. The spindle 51 can move through the clutch 77 without difficulty, since the wedge conformation operates in the other direction. Immediately after this setting of the spindle 51 has been accomplished, the solenoid is de-energized and returns the sleeve 82 and the lever 85 to the original inoperative position at the right. The spring 69 tries to push the spindle 51 to the right again, but it cannot do so because, at this time, the clutch 77 prevents motion of the spindle to the right because of the jamming of the ball 78 between the inclined surface 79 and the surface of the spindle. The spindle is locked in place and the amount of valve opening is, therefore, determined. The motion just described above is the type of motion which takes place when the spindle 51 is being moved to the left from one position to another. When, however, it is to be moved to the right from one position to another to increase the size of the orifice areas, when the lever 85 strikes the end of the screw 99 it can no longer carry the head 89 of the plunger 88 to the left any further. Nevertheless, this head is still not in contact with the end of the spindle 51. The motion between the sleeve 82 and the lever 85 the solenoid continues to carry the sleeve 82 to the left and, eventually, the end of the sleeve strikes the ball 77 and forces it to the left. This releases the spindle 51 and causes it to move to the right under the impetus of the spring 69. Eventually, it strikes the head end of the plunger 88 and stops. Then, when the solenoid retracts the lever 85 and the sleeve 82, the spindle remains in the position determined by the position of the head 89 of the plunger 88 and a new adjustment has been made.

It will be noted that the piston 23 is only provided with one piston rod 24. This means that the area on the left side of the piston is greater than the area on the right side and it is necessary to have an equalizing factor in the resistance to the discharge of oil. In order to do this, the pressure-regulating valve 61 is set at a different point when oil is being pressed out of the right-hand side of the piston 23, than it would be when it is being pressed from the left-hand side. To accomplish this, the coil 74 is energized to change the position of the plunger 73. This, in turn, changes the tension in the coil spring 72 and changes the pressure in the conduit 62 which is regulated by the valve 61. This change in pressure, of course, permits a different flow rate through the orifice 65, so that the same settings of the spindle 51 in its bore 49 produce the same rate of movement of the piston 23 and the tool support 13, irrespective of which side of the cylinder the oil is being expressed from.

Referring to FIG. 2, it should be noted that not only does the oil leaving the orifice 65 pass outwardly of the end of the bore 49 into the passage 66 on its way to join the oil coming from the orifice 54, but the oil is also permitted to pass through the conical recess 68 and through a bore 103 extending through the cylindrical portion 67 of the spindle and a lateral passage 104 leading to the discharge. This means that there will be no reaction pressures acting on the spindle 51 that will tend to move it during discharge of oil through the orifice 65. Incidentally, in FIG. 2, the high-pressure passage 50 is shown in dotted lines coming through the body 48 from behind the spindle 51 and to its left the discharge conduit is also shown in dotted lines.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. In a machine tool having a hydraulic system for producing tool movement, a regulating valve, comprising:
   (a) a main body having a bore,
   (b) a spindle slidably mounted in the bore,
   (c) an orifice formed in a portion of the bore and carrying fluid flow therethrough, the spindle cooperating with the orifice, the area of the orifice available for flow being at a maximum at a first position of the spindle and being at a minimum at a second position of the spindle,
   (d) a second orifice formed by the cooperative relationship of a portion of the spindle with a portion of the bore, the area of the second orifice being at a large value when the spindle is in the first position and being completely closed at all positions of the spindle lying between a midway position and the said second position, and
   (e) means including a cam for establishing the position of the spindle at various predetermined positions between the said first and second positions, the particular predetermined position being determined by the position of the cam relative to the spindle, said means including also a clutch to hold the spindle in the predetermined position despite a change in cam position, a lever arm engaging the cam and acting to determine the spindle position, the cam consisting of a disc mounted for rotation about its axis with the said axis extending parallel to the axis of the spindle, a number of adjustable screws arranged in a circle with equal spacing about the periphery of the disc with their axes parallel to the disc axis, the periphery of the disc residing adjacent the spindle for contact between the lever arm and one of the screws at a time.

2. In a machine tool as recited in claim 1, the disc being rotated so as to position a particular screw in lever-engaging position by a motor of the type which rotates through a small angle in response to a single pulse of electrical energy.

3. In a machine tool as recited in claim 2, a solenoid connected to the lever to move the lever from a retracted position to an operative position of contact with a screw of the cam and back again.

4. In a machine tool as recited in claim 3, a sleeve connected to the solenoid and operative as the solenoid moves the lever on a stroke for engagement with the cam to engage the clutch and release the spindle, there being a lost-motion connection between the sleeve and the lever.

5. A machine tool, comprising:
(a) a base,
(b) a tool support mounted on the base for sliding motion relative thereto,
(c) a hydraulic motor connecting the base and the tool support to bring about the said sliding motion for accomplishing a machining cycle,
(d) a reversing valve connected to the motor for connecting it alternatively to a source of fluid under pressure and to drain,
(e) means associated with the valve for regulating the flow of the said fluid, the means including a variable orifice the area of whose opening can be changed to predetermined sizes to produce predetermined rates of sliding motion of the tool support relative to the base, and
(f) means for varying the size of the said orifice in a predetermined programmed sequence during a machining cycle.

6. A machine tool as recited in claim 5, wherein a compensator is associated with the said variable orifice to maintain a predetermined pressure drop in the fluid as it passes therethrough, irrespective of the size of the opening.

7. A machine tool as recited in claim 5, wherein the said means provides two paths for fluid flow, one of the paths including the said first variable orifice, the other of the paths also including a second variable orifice, the second orifice being of large area when open, but being completely closed when the first orifice is still open.

8. A machine tool as recited in claim 5, wherein the said means includes a first variable orifice and a second variable orifice, the major portion of the fluid flow taking place through the second orifice at high rates of the said sliding motion and the major portion of the fluid flow taking place through the first orifice at low rates.

9. A machine tool as recited in claim 8, wherein a pressure regulating valve is associated with the first orifice to maintain the fluid pressure ahead of the orifice at a fixed predetermined valve, irrespective of the rate of flow of fluid through the orifice.

References Cited
UNITED STATES PATENTS

| | | | |
|---|---|---|---|
| 2,161,150 | 6/1939 | Flygare | 51—233 X |
| 2,526,034 | 10/1950 | Mathys | 51—344 X |
| 2,550,543 | 4/1951 | Fairest | 51—233 |
| 2,811,016 | 10/1957 | McRae | 91—449 X |

HAROLD D. WHITEHEAD, *Primary Examiner.*